United States Patent [19]

Anglerot

[11] Patent Number: 5,308,631
[45] Date of Patent: May 3, 1994

[54] PROCESS OF MAKING ALCOHOL-FREE BEER AND BEER AROMA CONCENTRATES

[75] Inventor: Didier Anglerot, Lons, France
[73] Assignee: Ceca, S.A., France
[21] Appl. No.: 777,087
[22] Filed: Oct. 16, 1991

[30] Foreign Application Priority Data

Oct. 26, 1990 [FR] France .................. 90 13307

[51] Int. Cl.⁵ .................................................. C12C 9/00
[52] U.S. Cl. ............................................ 426/422; 426/11; 426/387; 426/423; 426/592
[58] Field of Search ................. 426/422, 7, 11, 14, 426/16, 29, 386, 387, 423, 424, 590, 592, 600

[56] References Cited

U.S. PATENT DOCUMENTS

| | | | |
|---|---|---|---|
| 4,882,177 | 11/1989 | Dziondziak | 426/14 |
| 5,013,447 | 5/1991 | Lee et al. | 426/14 |

FOREIGN PATENT DOCUMENTS

| | | |
|---|---|---|
| 101254 | 4/1983 | European Pat. Off. |
| 228572 | 11/1986 | European Pat. Off. |
| 231072 | 1/1987 | European Pat. Off. |
| 213220 | 11/1987 | European Pat. Off. |
| 245841 | 12/1987 | European Pat. Off. |
| 332738 | 7/1988 | European Pat. Off. |
| 2106755 | 4/1972 | France |
| 2567868 | 7/1984 | France |
| 2575741 | 1/1985 | France |
| 2564451 | 11/1985 | France |

OTHER PUBLICATIONS

Bruschke et al., DE 3804236A1, 1989, abstract only.
Patent Abstracts of Japan vol. 13, No. 224, (C-599) (3572) May 24, 1989 and JP-A-1 34945 (JGC Corp) Feb. 6, 1989.
Ullmann's Encyclopedia of Industrial Chem. 5th ed., vol. 4, p. 421.
Kirk-Othmer Ency. of Chem.-Tech., 3rd, vol. 3, p. 692.
Cysewski, G. R. et al, Biotech Bioeng., 1978, 20, 1421.
Bibby & Milestone, J. Chem. Tech Biotechnol., 1981, 31, 732.
Farhadpour, Eur. Brew. Conv., 1983, 12, pp. 203–217.
Farhadpour, Processing, Sep. 1987, p. 42.

Primary Examiner—Donald E. Czaja
Assistant Examiner—Leslie Wong
Attorney, Agent, or Firm—John L. Sigalos

[57] ABSTRACT

The process comprises bringing into contact a naturally alcoholic beer with a hydrophobic zeolite, separating the aqueous eluent phase from the adsorbent, thermally desorbing the adsorbed products, recovering the desorbed phase and separating it by distillation into an alcoholate and an aromatized phase, then reconstituting an alcohol-free beer by mixing the dealcoholized aqueous phase and the aromatized phase with, secondarily, saturation of the reconstituted beer with gaseous carbon dioxide. The reconstituted beer preserves the organoleptic properties of the initial beer.

10 Claims, 3 Drawing Sheets

PROCESS OF MAKING ALCOHOL-FREE BEER AND BEER AROMA CONCENTRATES

BACKGROUND OF THE INVENTION

The present invention pertains to a process of making alcohol-free beer.

Beer is a fermented beverage whose origin goes far back in time. Beer is principally made from barley malt and is highly valued for its savour and its plentiful foam. Additional on the subject of beer can be found in encyclopedias such as Ullmann's Encyclopedia (Ullman's Encyclopedia of Industrial Chemistry, 5th Edition, Vol. 4, p. 421) or the Kirk-Othmer Encyclopedia (Encyclopedia of Chemical Technology, 3rd Edition, Vol 3, p. 692). It can be stated very schematically for the present purpose that beer is a beverage which is rich in fixed or volatile aromatic substances and in alcohol. For various legal, dietary, cultural and even religious reasons, there is interest in the production of alcohol-free and low-alcohol beers. The technical objective has been established to ferment beers which despite their low final content of alcohol will preserve their organoleptic properties.

Normal beers ordinarily contain 4 to 8% alcohol but some contain more than 10% and others barely exceed 2%. Opposed to them are low-alcohol beers that contain circa 2% alcohol, very-low-alcohol beers (0.5 to 1%), alcohol-free beers that must contain less than 0.5% alcohol, and alcohol-free malt beverages containing less than 0.05% alcohol. Only the last two types are considered by the law to be alcohol-free beverages.

Diverse techniques have been employed to achieve the objective of beers containing little or no alcohol such as fermentation (European Patent Application 213,220) which is stopped before the alcohol level becomes too high (however, by blocking the formation of alcohol there is also a reduction in the production of the aromas specific to beer); fermentation using strains selected to not produce alcohol (European Patent Application 245,841); distillation (Cysewski, G. R. et al., Biotech. Bioeng. 1976, 18, 1297; 1977, 19, 1125) by means of which the alcohol is eliminated by heating the beer which simultaneously degrades the protein components and the sugars; membrane separation (Cysewski G. R. et al, Biotech. Bioeng. 1978, 20, 1421) and its variants comprising reverse osmosis (U.S. Pat. No. 4,317,217); and pervaporation (European Patent Application 332,738) which nevertheless leaves from 1 to 1.5% of alcohol in the final product and which involves very delicate application techniques.

The production of alcohol from aqueous alcoholic solutions via extraction with hydrophobic adsorbents, more specifically hydrophobic silicas or hydrophobic zeolitic silico-aluminates, is disclosed in European Patent Application No. 101,254. The adsorbents employed for the application of this procedure are zeolites with an Si:Al ratio higher than 12 and notably zeolites such as those obtained in accordance with the procedure described in French Patent No. 2,567,868 (CFR) β-zeolites, silica-rich offretites (French Patent 2,575,741) or the USY zeolites with an Si:Al ratio higher than 12 that Bibby and Milestone (J. Chem. Tech. Biotechnol. 1981, 31, 732) discovered were suitable for the extraction of molecules dissolved in water, but less polar than water. It might appear attractive to transpose the principle of this technique to the fabrication of alcohol-free beverages. In addition, Farhadpour (Eur. Brew. Conv. 1983, 12, pp. 203–217, then Processing, Sept. 1987, p. 42) has proposed the extraction of alcohol from beer by adsorption on a very closely related adsorbent, a hydrophobic silica (silicalite).

It is certainly possible to obtain beer containing little or no alcohol with these various techniques, but the fermentation processes that generate little alcohol also generate few aromas and, in terms of the dealcoholization processes, it is not possible to extract the alcohol without an at least partial loss of aromas and it is frequently necessary to readjust the flavors of the product in the final stage, e.g., by means of aromas extracted from yeasts (French Patent 2,106,755).

SUMMARY OF THE INVENTION

The present invention resolves these shortcomings and offers a means for the industrial preparation of a correctly dealcoholized beer, employing dealcoholization of a normally fermented beer by adsorption on a hydrophobic adsorbent, but, nevertheless, from a taste point of view, offering the aromas and flavors of a good quality beer.

The process comprises coadsorption of the alcohol and aromas on a hydrophobic molecular sieve to form an aqueous eluent and an adsorbed phase, an intermediate step involving purging of the column, a step involving separation of the aqueous phase and the adsorbent charged with the adsorbed products (alcohol and aromatic extracts), a step involving desorption of the fraction coadsorbed on the hydrophobic molecular sieve with recovery of the desorbed phase, fractionation of this adsorbate into alcohol and an aromatic extract, and the recomposition of the beer by mixing the dealcoholized eluent and the aromatic extract with, secondarily, saturation of the reconstituted beer with carbon dioxide.

The invention also comprises the process of making a concentrate of natural beer aromatic extracts as hereinafter set forth.

DETAILED DESCRIPTION

Figure 1:
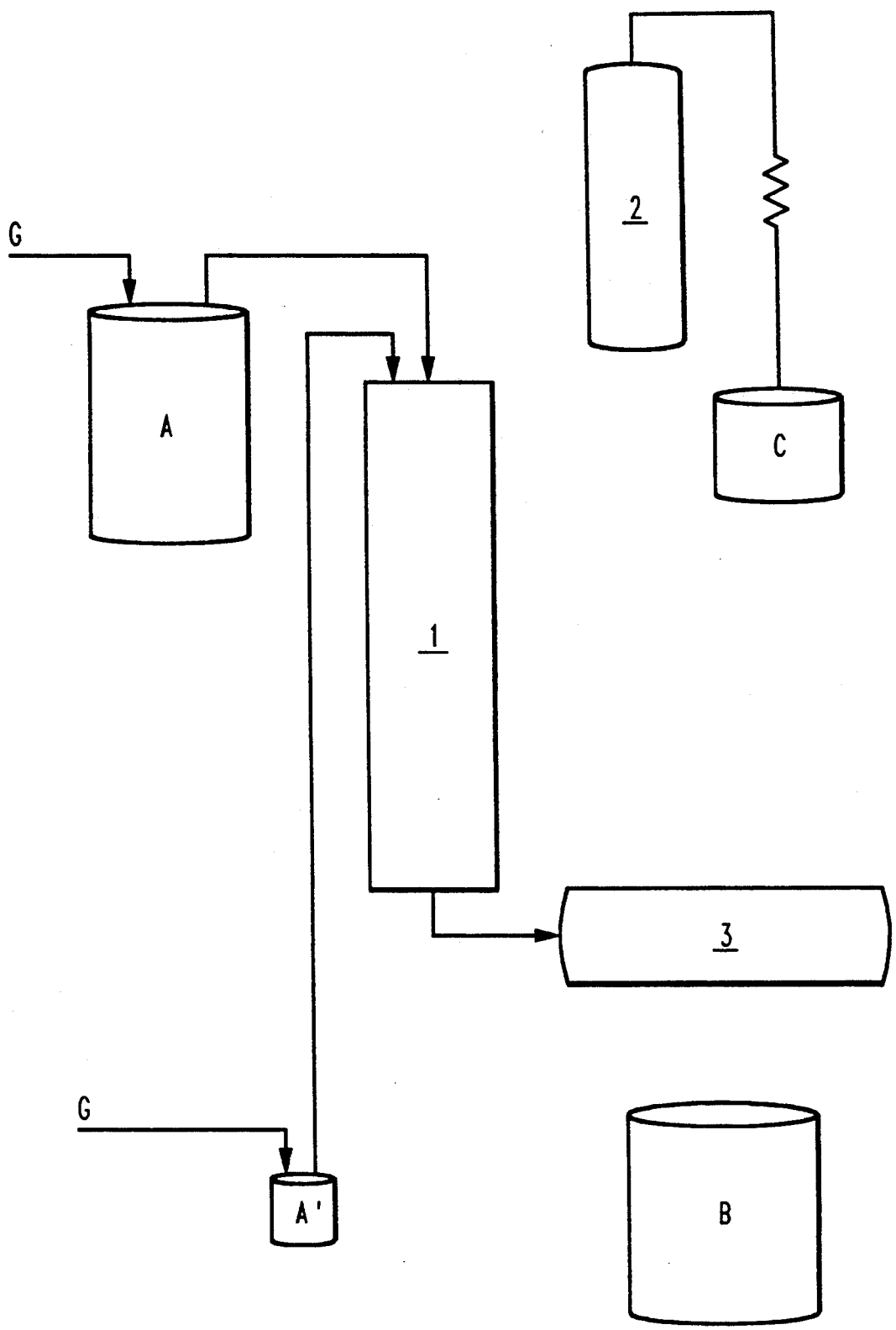
FIG. 1 is a schematic diagram of an apparatus system and processing sequence of an adsoption step in accord with the present invention.

The molecular sieves which are the means for this adsorption step of the procedure are essentially zeolites with an Si:Al molecular ratio higher than 12 and which are universally considered to be hydrophobic zeolites. Among the hydrophobic zeolites employable for the invention are the MFI type zeolites, the β-zeolites, the theta-zeolites, and the silica-rich offretites. In a preferred form of the invention, the zeolite employed is prepared in accordance with French Patent No. 2,564,451 and formed in accordance with a known method. It is also possible to employ faujasites with an Si:Al ratio > 12; these products are obtained by dealumination using known means (e.g., steam treatment and acid wash or treatment with $SiCl_4$).

For the implementation of the process, the step involving coadsorption on a hydrophobic molecular sieve can be realized by any conventional means which brings into contact the zeolite and the beer to be dealcoholized, e.g., suspension in a closed reactor, fluidized bed, and the like. It is advantageously implemented in a column. In such case, the various steps of the process in accordance with the invention are performed as set forth below and illustrated in the drawings.

A. Adsorption step.

There is shown in FIG. 1 a tank A and an annex tank A' from which beer is caused to percolate under the pressure of carbon dioxide G into a column 1, filled with a hydrophobic molecular sieve. The temperature is maintained below 30° C., preferably around 5° C. The unit 1 is protected from air; it is advantageous for this purpose to maintain a canopy of carbon dioxide under slight pressure. The percolation of the beer is continued until the eluent has an alcohol concentration of 0.1%. The eluent is a colored, tasty, foamy liquid that has preserved the majority of the dry extract (sugars and proteins) of the initial beer. It is stored in a tank 3. The adsorption step is then complete.

B. Step involving separation of the aqueous phase-/adsorbent.

Figure 2:
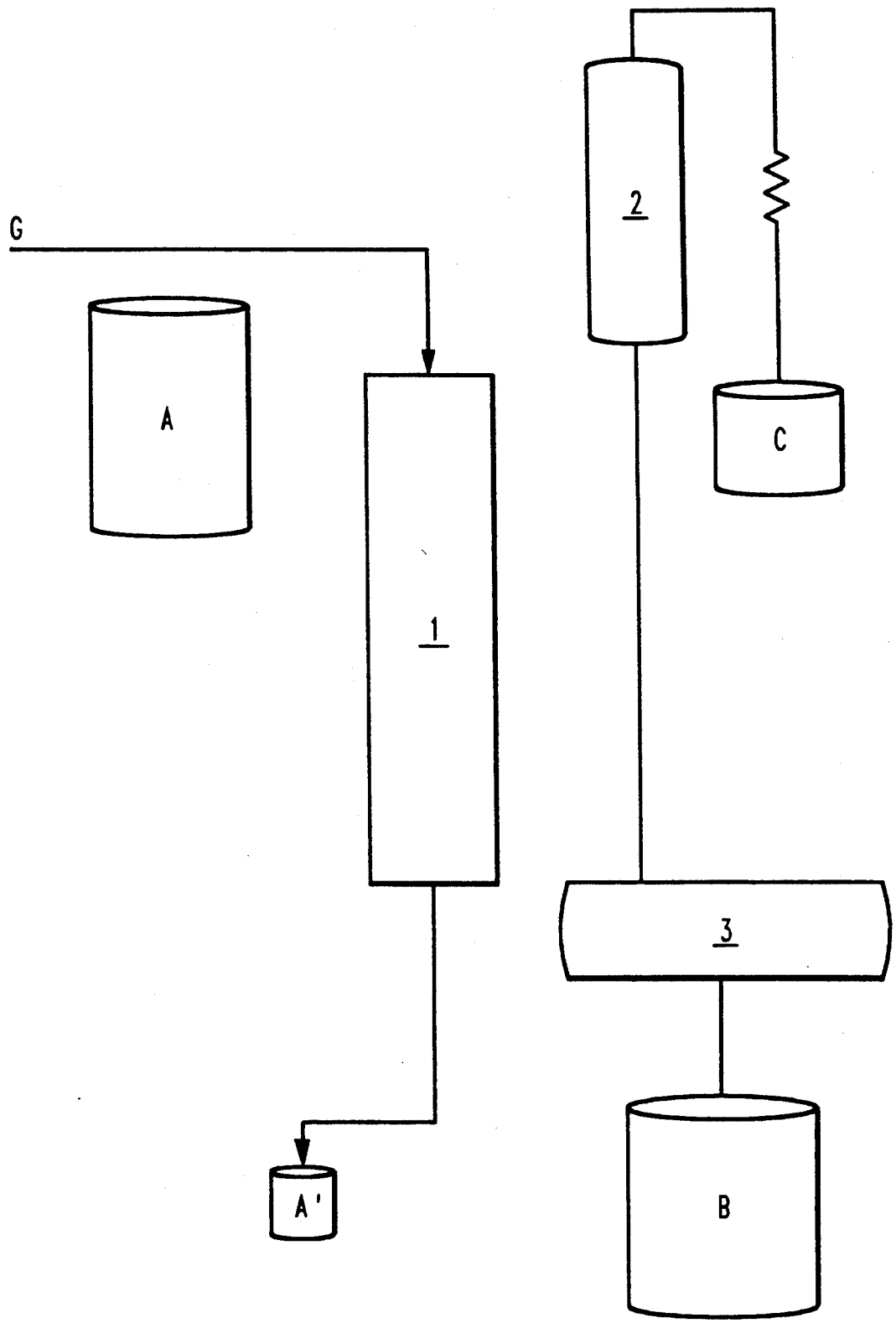
FIG. 2 is a schematic diagram of the apparatus system and processing sequence of separation of the aqueous phase and adsorbent in accord with the present invention.

This is best shown in FIG. 2 in which the interstitial beer is evacuated from column 1 by sweeping with $CO_2$. This beer is temporarily stored in annex tank A' to be repassed through the adsorption column in a subsequent cycle.

C, D, and E. The desorption, recovery of the desorbed step, and separation of the desorbed phase into an alocoholate and an aromatized phase.

Figure 3:
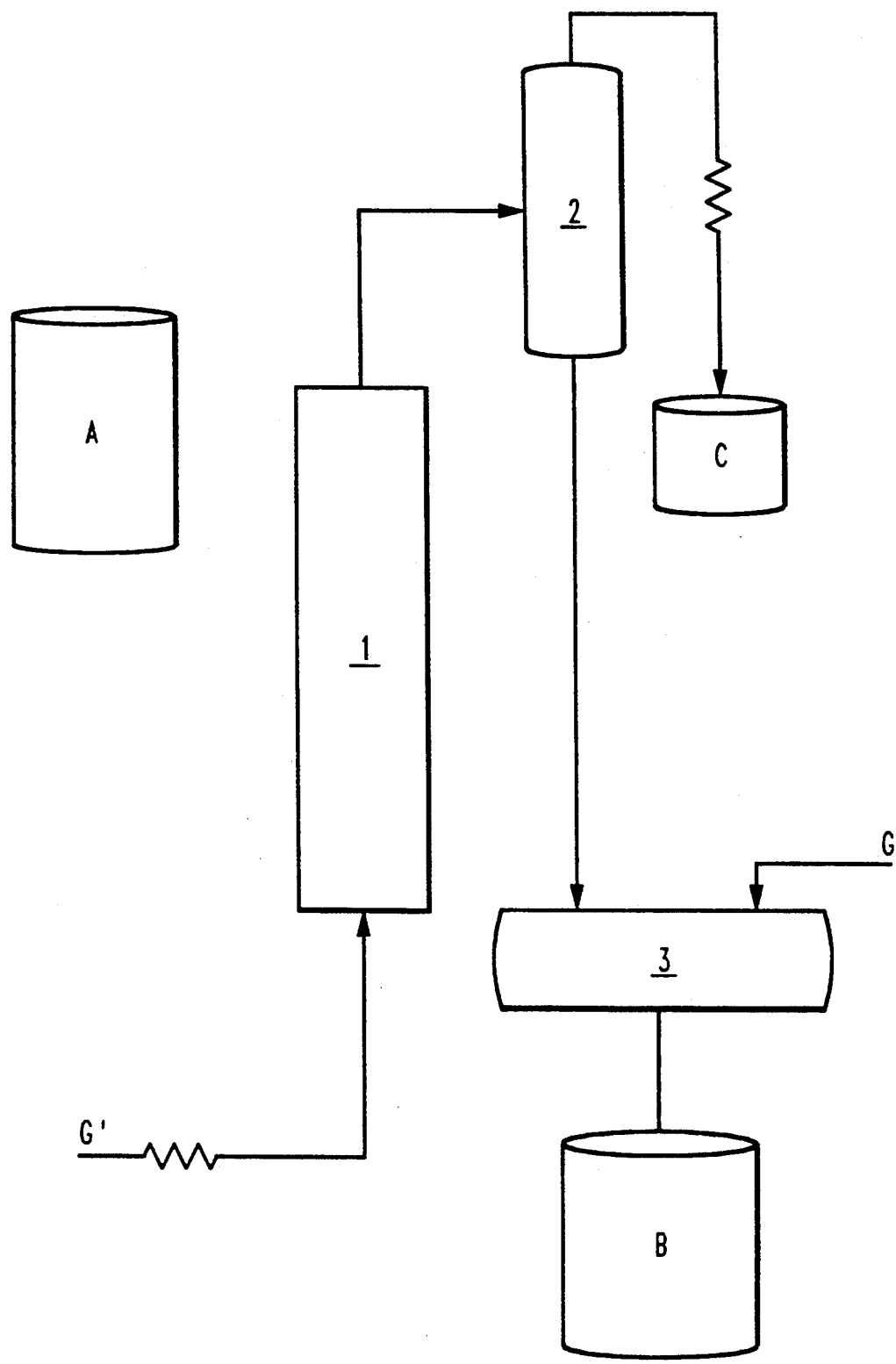
FIG. 3 is a schematic diagram of the apparatus system and processing sequence of a desorption, recovery, and final product separation step in accord with the present invention.

This is best shown in FIG. 3 in which the desorption of the alcoholic and aromatic products trapped in the hydrophobic zeolite in column 1 is performed by elution or heating. Elution can be performed with a solvent, but it is then necessary to subsequently separate out this solvent. A good method is comprised of using supercritical $CO_2$ and recovering the alcohols and aromas by expansion. It is also possible to eluate using a hot gas with the condition, however, that the gas be free from oxygen. It is preferable to perform thermal desorption with carbon dioxide G' at a temperature of circa 150° C. passed into column 1. Upon discharge from column 1, the charged gas passes into a separator 2 from the head of which is discharged the alcohol which is recovered in tank C and from the bottom of which is collected an aromatic aqueous extract which is stored in tank 3. This extract is particularly fragrant and has a characteristic beer smell. It is an aqueous phase that contains, among other substances, light aromas, $\beta$-phenylethanol and isoamyl alcohol.

F. Recomposing the beer.

This is best shown in FIG. 3 in which the preceding extract is mixed with the nonalcoholic eluate. In practice, it is carried out at the same time as the proceding phase in tank 3. At the end of the operation, the $CO_2$ is repressurized and the dealcoholized beer is evacuated into the bank B.

It will be evident that the aromatic aqueous extract for other purposes, such as use in making "beer" batters and doughs and in such instances the extract need not recombined with the eluents.

The invention will be further described in connection with the following examples which are set forth for purposes of illustration only.

EXAMPLE 1

(Comparative)

A beer is simulated using a 5% aqueous solution of ethanol containing $\beta$-phenylethanol to simulate the light aroma. The "pseudo-beer" is passed over a column of MFI type hydrophobic zeolite. The following values were determined in the liquor discharged from the column:

| Flow rate | Ethanol | $\beta$-phenylethanol |
| --- | --- | --- |
| Control | 4.6% | 17 mg/L |
| 0.5 L/h | 0.6% | $\approx 1$ mg/L |
| 2.5 L/h | 2.6% | $\approx 10$ mg/L |

These figures demonstrate that the hydrophobic zeolite extracts, with separation, both the alcohol and the simulated flavor.

EXAMPLE 2

An installation capable of producing 200,00 hL per year of alcohol-free beer has three 16-$m^3$ adsorbers. Each adsorber contains 8 tons of MFI type zeolite with an Si:Al ratio higher than 50, synthesized in a fluoride mediumm and agglomerated with a clay, the dynamic capacity of which is circa 3.5% of ethanol, perating in 4-hour cycles. The entire installation as depicted in FIGS. 1, 2, and 3 is maintained under a $CO_2$ pressure circa 200,000 Pa and operated as discussed above. The dealcoholized beer is of excellent quality and has all of the organoleptic properties of the beer before treatment.

In addition to alcohol-free beer, the installation produces 8,000 hL of 95% alcohol.

While the invention has been described in connection with a preferred embodiment, it is not intened to limit the scope of the invention to the particular form set forth, but on the contrary, it is intended to cover such alternatives, modifications, and equivalents as may be included within the spirit and scope of the invention as defined by the appended claims.

What is claimed is:

1. A process for obtaining alcohol-free beer from a naturally alcoholic beer, consisting of:
   (a) bringing into contact an alcoholic beer with a solid adsorbent consisting of a hydrophobic zeolite to form an aqueous eluent phase and products adsorbed on said adsorbent;
   (b) separating the aqueous eluent phase from the adsorbent;
   (c) thermally desorbing said adsorbed products to form a desorbed phase;
   (d) recovering the desorbed phase;
   (e) separating the desorbed phase into an alcoholic phase and an aromatic aqueous phase; and
   (f) reconstituting an alcohol-free beer by mixing the aqueous phases recovered at the end of (b) and (e).

2. The process of claim 1, wherein the hydrophobic zeolite is selected from MFI zeolites, $\beta$-zeolites, theta-zeolites, the offretites, or the silica rich faujasites.

3. The process of claim 1 or 2, wherein the adsorbent is an MFI zeolite.

4. The process of claim 1 or 2, wherein the adsorbent is a silica-rich β-zeolite.

5. The process of claim 1 or 2, wherein the adsorbent is a silica-rich theta-zeolite.

6. The process of claim 1 or 2, wherein the adsorbent is a silica-rich offretite.

7. The process of claim 1 or 2, wherein the adsorbent is a silica-rich faujasite.

8. The process of claim 1 or 2, wherein gaseous carbon dioxide is employed for the thermal desorption.

9. The process of claim 1 or 2, wherein the contact betwen the alcoholic beer and the adsorbent is carried out in a column filled with adsorbent.

10. The process of obtaining a natural beer aromas, consisting of:
   (a) bringing into contact an alcoholic beer and a hydrophobic zeolite with an Si:Al ratio higher than 12 to separate said beer into an aqueous eluent phase and an adsorbed product phase;
   (b) separating the aqueous eluent phase from the adsorbent;
   (c) thermally desorbing the adsorbed products on said adsorbent; and
   (d) separating the desorbed phase into an alcoholic distillate phase and an aqueous phase, said aqueous phase constituting the concentrate of natural beer aromas.

* * * * *